(12) United States Patent
Marshall

(10) Patent No.: US 7,607,711 B2
(45) Date of Patent: Oct. 27, 2009

(54) POWER OPERATED RETRACTABLE TAILGATE ASSEMBLY

(75) Inventor: Robert L. Marshall, Salem, KY (US)

(73) Assignee: Bob Marshall Enterprises, Inc., Salem, KY (US)

( * ) Notice: Subject to any disclaimer, the term of this patent is extended or adjusted under 35 U.S.C. 154(b) by 0 days.

(21) Appl. No.: 12/283,140

(22) Filed: Sep. 9, 2008

(65) Prior Publication Data

US 2009/0167044 A1    Jul. 2, 2009

(51) Int. Cl.
*B62D 25/00* (2006.01)
(52) U.S. Cl. ................................. 296/51
(58) Field of Classification Search ........... 296/57.1, 296/50, 51, 26.09, 37.6, 26.11, 26.08, 26.1, 296/26.01
See application file for complete search history.

(56) References Cited

U.S. PATENT DOCUMENTS

| | | | | |
|---|---|---|---|---|
| 3,010,760 | A * | 11/1961 | Trautmann | 296/57.1 |
| 4,531,773 | A * | 7/1985 | Smith | 296/26.11 |
| 4,580,828 | A * | 4/1986 | Jones | 296/57.1 |
| 4,900,217 | A * | 2/1990 | Nelson | 414/537 |
| 5,478,130 | A * | 12/1995 | Matulin et al. | 296/57.1 |
| 5,533,771 | A * | 7/1996 | Taylor et al. | 296/26.1 |
| 5,788,311 | A * | 8/1998 | Tibbals | 296/62 |
| 5,816,637 | A * | 10/1998 | Adams et al. | 296/26.09 |
| 6,270,139 | B1 * | 8/2001 | Simpson | 296/62 |
| 6,276,738 | B1 * | 8/2001 | Marshall | 296/57.1 |
| 6,293,602 | B1 * | 9/2001 | Presley | 296/26.11 |
| 6,988,756 | B1 * | 1/2006 | Meinke et al. | 296/50 |
| 7,204,537 | B1 * | 4/2007 | Oh et al. | 296/26.09 |
| 7,243,968 | B2 * | 7/2007 | Kiester et al. | 296/37.6 |
| 7,347,474 | B2 * | 3/2008 | Shagbazyan | 296/26.1 |
| 2002/0074817 | A1 * | 6/2002 | Bailey | 296/57.1 |

\* cited by examiner

*Primary Examiner*—Kiran B. Patel
(74) *Attorney, Agent, or Firm*—Carrithers Law Office, PLLC; David W. Carrithers

(57) ABSTRACT

A power operated retractable tailgate assembly for a vehicle that includes a tailgate with opposite end edges thereof connected via sliding pivots to a respective one of a pair of elongate slide rails. The slide rails mount in lateral spaced apart relation on the underside of the floor of the cargo carrying box on the vehicle. A first extendible and retractable assembly, having relatively movable respective first and second portions, has the first portion anchored to the vehicle and a second portion that is hingedly connected to the tailgate proximate a lower marginal edge thereof. A power means is operatively connected to the extendible and retractable assembly and is operable from within the cab of the vehicle selectively to extend and retract the tailgate by moving the tailgate along the slide members. A second power operated extendible and retractable assembly is connected to the tailgate to move the same from its open position wherein it is horizontally disposed and projects rearwardly from the vehicle to a raised closed position wherein it is disposed vertically. Each of the extendable and retractable assemblies include a hydraulic cylinder unit operatively associated with a motor driven pump.

9 Claims, 6 Drawing Sheets

POWER OPERATED RETRACTABLE TAILGATE ASSEMBLY

RELATED APPLICATIONS

This application claims priority from U.S. Provisional Application Ser. No. 60/592,570 filed on May 1, 2006 and U.S. Pat. No. 7,422,519 which issued on Sep. 9, 2008 from U.S. application Ser. No. 11/502,012 filed on Aug. 9, 2006 and published as U.S. Publication No. 2007/0252402 on Nov. 1, 2007.

FIELD OF THE INVENTION

This invention relates generally to a tailgate for use on for example a pickup truck and more particularly to a power operated tailgate, to a power operated retractable tailgate and to a motorized vehicle incorporating a power operated tailgate that can be actuated from within the cab of the vehicle.

DESCRIPTION OF THE PRIOR ART

Pickup trucks typically have a cargo space rearward of the cab portion of the truck. The cargo space is generally defined by a front end wall and a pair of laterally spaced apart side walls that extend vertically upwardly from a floor or "bed" of the truck. The rear wall is an open area that is selectively covered and uncovered by a tailgate moveable from one to another of a first 'closed' and a second 'open' position. The tail gate is pivotally mounted on the vehicle near the floor at the trailing end the cargo space and in the first position it is vertically disposed closing the open rear wall. The tailgate pivots downwardly to its second position wherein it is generally horizontally disposed and projects rearwardly from the trailing end of the vehicle.

Tailgates conventionally have these two basic positions the first being a tailgate vertical "up" position for forming a cargo box and the second wherein the tail gate is horizontal i.e. "down" position in which an upper surface of the tailgate is usually coplanar with the floor. In some vehicle models the tailgate is removable.

The tailgate is usually held in the vertical "up" position by a latch mechanism such as a chain or peg in cooperative engagement with alignable loops attached to the sidewalls and tailgate or by a pair of longitudinal members on each side of the tailgate wherein a selected distal end is connected to the sidewall panel and one end is connected to the tailgate. The longitudinal members usually are joined in the center by a rivet allowing the folding of the members for nesting within the tailgate.

Although the tailgate usually remains in the up position, there are times when the user finds it advantageous to lower the tailgate such as when pulling or backing a trailer. For instance, gooseneck trailers designed for hauling heavy equipment and/or livestock have been designed for coupling to a fifth wheel attachment of a truck frame or pickup truck bed whereby a coupling post extends downward from the trailer frame providing rotational support for pulling the trailer. The length of the horizontal frame provides sufficient space between the towing vehicle for pivoting movement of the towing vehicle relative to the trailer; however, depending upon the height of the coupling post, the trailer tongue extending backward from the coupling post may hit and damage the tailgate of the truck in some positions, such as the vertical erect position. A conventional tailgate which is lowered to a general horizontal plane also interferes with the ability to turn a gooseneck or other type trailer due to its rearward protrusion. Hanging the tailgate on the bumper forming an inclined plane angled toward the ground does not eliminate the restriction in the turning radius of the trailer in that the corners of the tailgate may still contact the gooseneck or body of the trailer and cause damage to the tailgate as well.

Another situation where the tailgate interferes with the use of the vehicle is where the user is backing the pickup truck into close adjacency to a loading dock and the user's vision is obscured or when the user is hooking up to a conventional ball hitch trailer wherein the hitch ball is located on the bumper below the level of the truck bed and tailgate.

The applicant's U.S. Pat. No. 6,276,738 granted Aug. 21, 2001 and entitled 'Retractable Tailgate Assembly' is directed to a retractable tailgate permitting leaving the rear of the cargo compartment open without having the tailgate extend rearwardly from the vehicle or downwardly with respect to the cargo compartment. This is accomplished by having the tailgate mounted on the vehicle via sliding pivots allowing the tailgate to be moved from its above referred to second position to a third position wherein the tailgate is located under the floor of the cargo box of the vehicle.

The retractable tailgate assembly disclosed in the foregoing patent includes a release mechanism located within a conventional pickup truck tailgate and a support frame for slidably retracting and holding the tailgate in-between the pickup truck bed and the frame. The retractable tailgate assembly can be incorporated into new pickup trucks or adapted to existing vehicles. The retractable tailgate does not extend beyond the bed of the truck a distance greater than a traditional original equipment manufacturer's, ("OEM")'s, tailgate and utilizes the conventional lock and pivot points of the OEM pickup truck tailgate. Other than being retractable the tailgate generally looks and performs as a conventional OEM tailgate so that it can be sat upon and used in the conventional manner; however, the lowering and retraction of the tailgate permits use of the vehicle with a gooseneck trailer attached to the fifth wheel of the pickup without the tailgate interfering with the turning radius or being damaged by the gooseneck trailer extension.

The retractable tailgate mounting assembly includes a tailgate support frame that is disposed under the truck cargo bed with one end being connected to the vehicle and the other end to the tailgate and a pair of elongate support members with each having an open faced channel slidably receiving therein a pivot pin projecting from an adjacently disposed edge of the tailgate. A release mechanism mounts on or alternatively is located within the tailgate for disengaging the tailgate pivot pins from a pin receiving recess in the vehicle structure or elongate support structure.

The retractable tailgate in applicants above referred to patent has to be manually moved from one to the other of its variously assumable positions.

A principal object of the present invention is to provide a power operated tailgate and a vehicle that incorporates the same.

An object of the present invention is to provide a power means connected to the tailgate for closing the same.

An object of the present invention is to provide a tailgate with power means connected thereto for moving the tailgate from one to the other of its second and third positions.

A principal object of the present invention is to provide a motorized vehicle that incorporates a power operated tailgate that can be actuated by controls located within the cab of the vehicle.

SUMMARY OF THE INVENTION

In keeping with the foregoing there is provided in accordance with the present invention a motor vehicle tailgate assembly comprising: a tailgate; a pair of elongate slide members mountable in lateral spaced apart relation on the vehicle; sliding pivot means interconnecting opposite ends of the tailgate with a respective one of said pair of elongate members, said pivot means being disposed proximate a lower marginal edge of the tailgate and slidable longitudinally along said elongate members; a first extendible and retractable assembly having relatively movable respective first and second portions with the first portion anchorable to the vehicle and said second portion being hingedly connected to the tailgate proximate a lower marginal edge thereof; and power means connected to said first assembly and operable selectively to extend and retract the same and thereby move said tailgate back and forth longitudinally along said slide members.

In accordance with a further aspect of the present invention there is provided a motor vehicle tailgate assembly comprising: a tailgate; a pair of elongate slide members mountable in lateral spaced apart relation on the vehicle; sliding pivot means interconnecting opposite ends of the tailgate with a respective one of said pair of elongate members, said pivot means being disposed proximate a lower marginal edge of the tailgate and slidable longitudinally along said elongate slide members; a first extendible and retractable assembly having relatively movable respective first and second portions with the first portion anchorable to the vehicle and said second portion being hingedly connected to the tailgate proximate a lower marginal edge thereof; a second extendible and retractable assembly having relatively movable respective first and second portions with the first portion anchorable to the vehicle and said second portion being connected to the tailgate to pivot the same on said sliding pivots moving the tailgate from a horizontal position where it projects rearwardly from the vehicle to a vertical closed position and power means connected to said first and second assemblies and operable selectively to extend and retract the same and thereby move said tailgate back and forth longitudinally along said slide members and pivot the same from a horizontal position to a vertical position.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
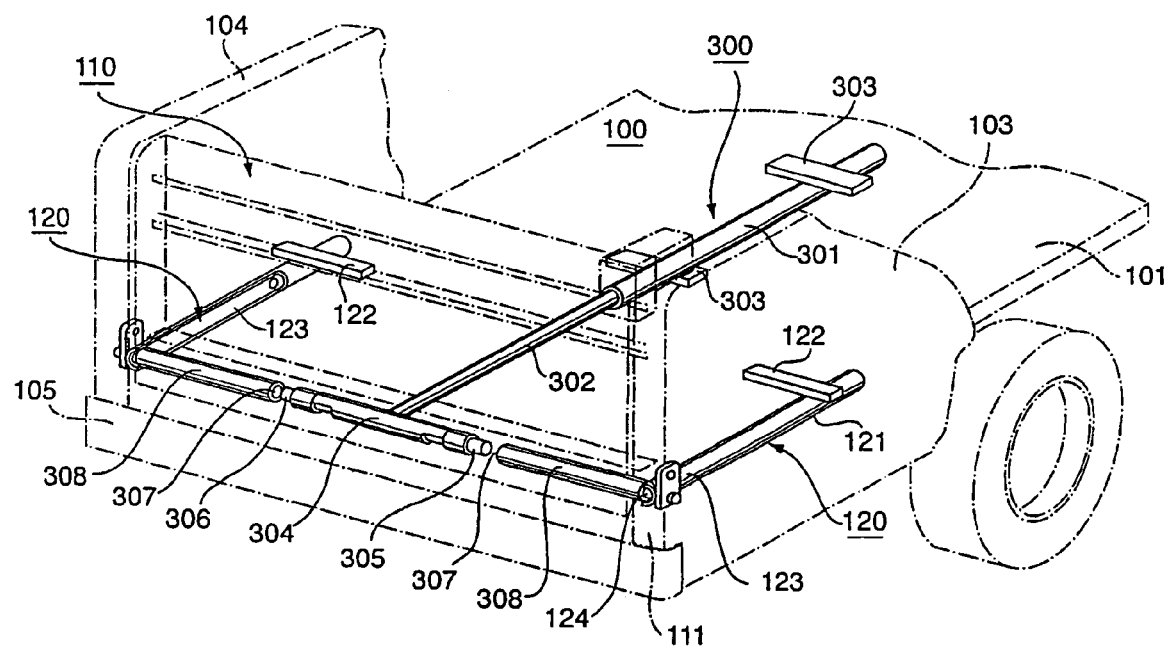
FIG. 1 is a perspective view showing the rear portion of a pick up truck and a retractable tailgate assembly with the tailgate in the raised vertical position and connected to power unit for moving it from one to the other of an extended and a retracted position.

FIG. 1 is similar to the pick-up truck retractable tailgate disclosed in applicants aforementioned U.S. Pat. No. 6,276,738 and differs therefrom by having remotely actuated power means to move the tail gate from one to the other of its second (horizontal) position and third (retracted) position. Illustrated in FIGS. 3-7 is a first power unit that is connected to the tailgate to move it from its horizontal second position to its vertical first position, and a second power unit to move the tail gate from one to the other of its second (horizontal) position and its third (retracted) position. It is to be understood that a vehicle may incorporate one or the other or both of the power units and may constitute an assembly for retrofitting a vehicle or incorporated during manufacture of the vehicle.

Referring to the drawings there is illustrated the back portion of a pick up truck comprising a cargo area 100 defined by a floor 101, a front wall 102 and a pair of laterally spaced apart side walls 103, 104. The truck is shown by broken lines and includes a rear bumper 105.

A tailgate 110 mounts on the truck by a pair of sliding pivot units 120 whereby the tailgate can be retracted under the bed of the truck box as more fully disclosed in applicant's aforementioned U.S. Pat. No. 6,276,738 the substance of which is incorporated herein by reference thereto. Each sliding pivot 120 includes an elongate slide rail 121 that attaches to the underside of the cargo bed as by one or more attachment members 122. Each slide rail has an elongate open faced channel 123 receiving therein a pin 124 projecting outwardly from the adjacent edge of the tailgate. The pivot pins are disposed at a location proximate the lower edge of the tail gate and may have a roller journalled thereon for rolling engagement in the channel. Alternatively the pivot pins can project into a hole or recess in respective ones of a pair of blocks slidably disposed in a respective one of the channels or the blocks may slidably embrace the elongate slide rails in which case the channels need not be present. The blocks maybe made of, or at least have a surface thereof in sliding contact with the elongate member, a friction reducing wear resistant material. The pivot pins maybe spring loaded to facilitate assembly/disassembly or alternatively fixedly secured to the tail gate.

The tailgate elongate members are located proximate a respective one of the laterally spaced apart side walls defining the cargo box and may be secured to the frame of the vehicle or alternatively and preferably the panels that define the truck box for example directly or via brackets to the underside of the floor and/or panels defining the side walls of the cargo box.

Pivotal movement of the tail gate is preferably limited to an arc of 90 degrees by for example one or the other or both power units connected thereto to move the same to and from its various assumable positions or hard points in pivotal connections of or to the tail gate.

Figure 2:
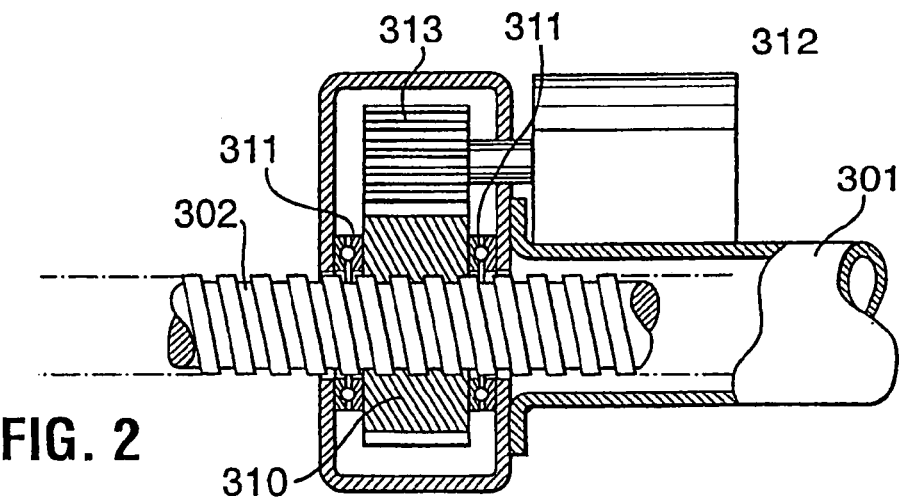
FIG. 2 diagrammatically and partial section illustrates a drive means for the extendible and retractable unit connected to the tail gate.
Figure 3:
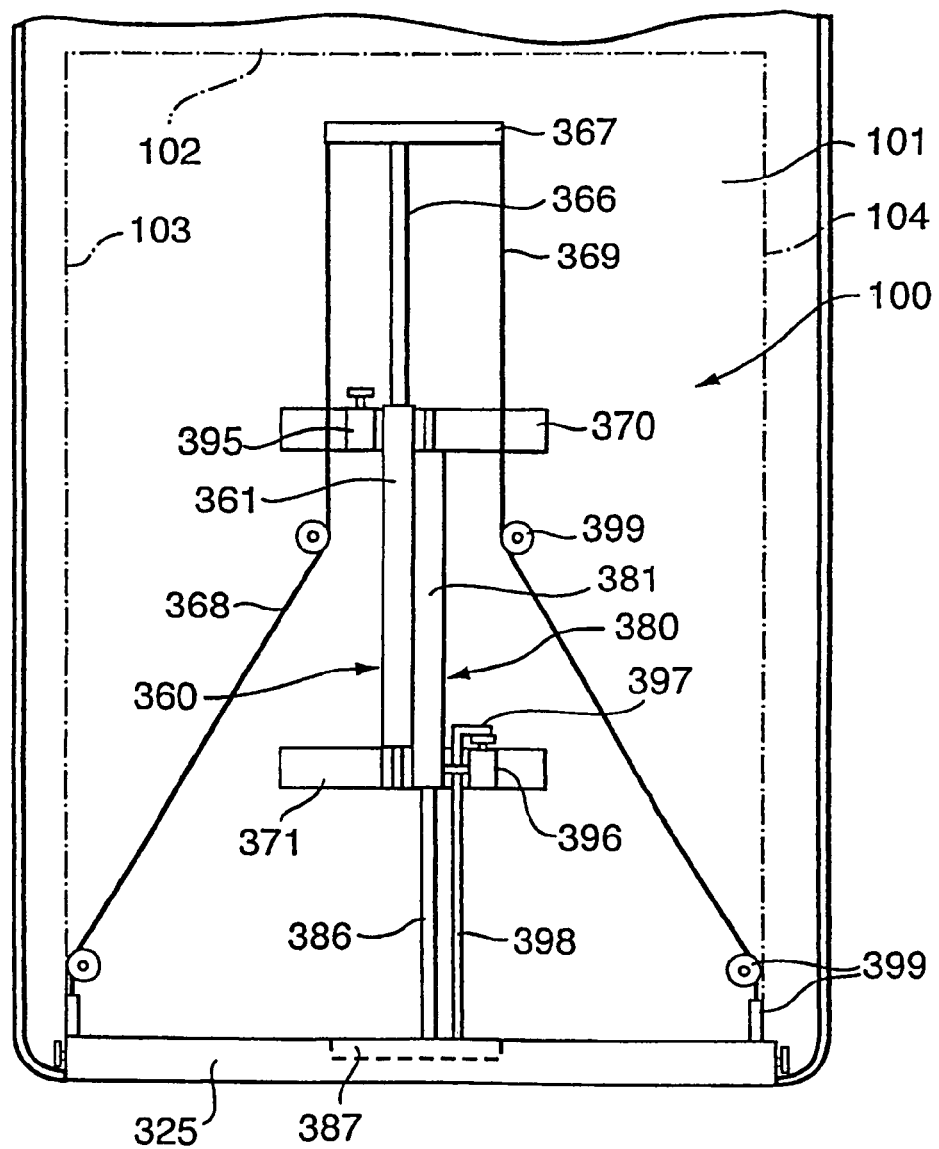
FIG. 3 is a diagrammatic top view with portions of the vehicle box removed for clarity of illustration and in which the tailgate is in an upright closed position and connected to first and second power units to move it from one position to another.
Figure 4:
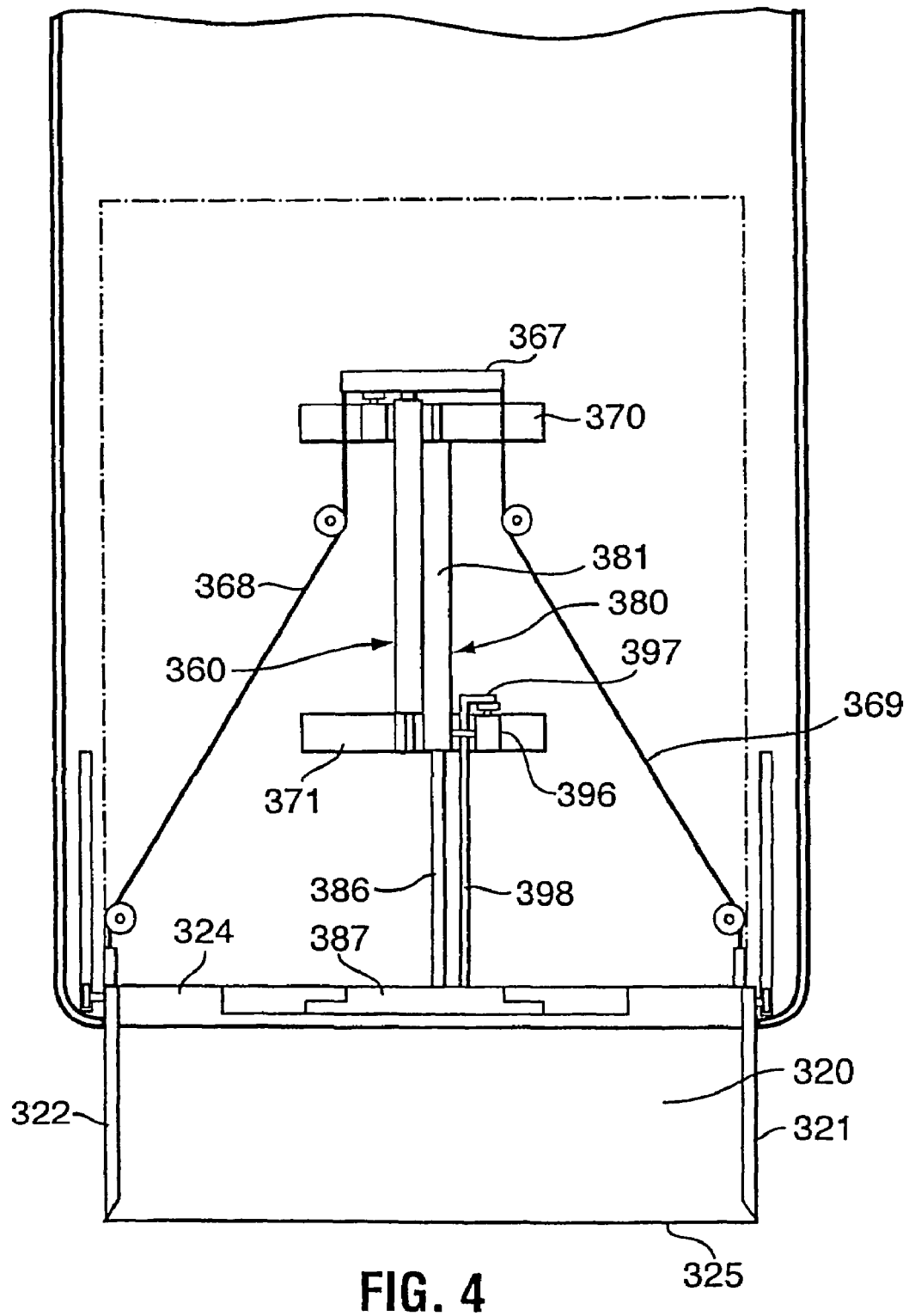
FIG. 4 is similar to FIG. 3 but with the tailgate disposed generally horizontal and projecting rearwardly from the rear of the vehicle i.e. open position.
Figure 5:
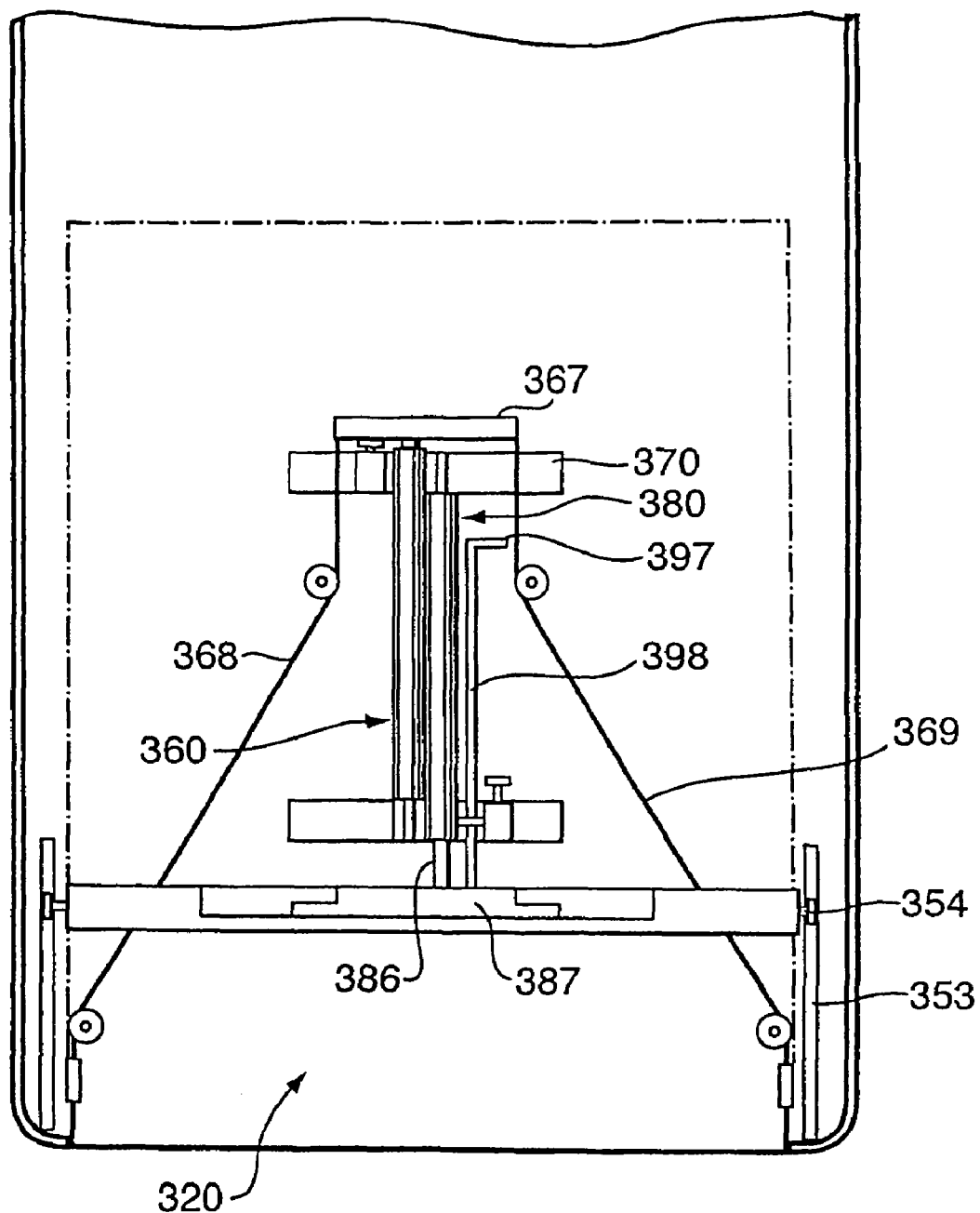
FIG. 5 is a diagrammatic top view illustrating the tailgate in a horizontal attitude and retracted so as to lie under the floor of the truck box.

Remotely operable power units are connected to the tail gate to move it from one of its various assumable positions to another. The power means for moving the tailgate 110 diagrammatically illustrated in FIGS. 3-7 includes a first power unit for moving the tail gate from its second (the horizontal open position), to its first (up or 'closed' position), and a second power unit that moves it from one to the other of its second position and a third positions where the tail gate is retractable under the floor of the cargo box. In FIGS. 1 and 2 only the second unit is shown and which may alternatively employ a screw jack type unit.

Referring to FIGS. 1 and 2, the extendible and retractable unit has a first portion 301 that can be securely fastened to the underside of the floor 101 and a second portion 302 that moves relative to the first portion and is hingedly connected to the lower edge of the tailgate.

The first portion 301 is stationary by being securely fastened to the vehicle for example by attachment members 303 that maybe strips of metal and/or plastics material fastened as by welding, studs and/or bolt and nut units and the second portion is movable relative thereto. The second portion 302 has a cross member 304 rigidly secured to the free outer end thereof and this cross member is pivotally connected at its free ends by pins 305, 306 to the lower edge of the tailgate. These pins project into a recess 307 in a respective one of a pair of members 308 secured to the lower edge of or incorporated in the structure of the tail gate. For ease of assembly/disassembly the pins maybe spring loaded and biased for example in a direction toward the receiving recess.

The portion 302 has an external thread 303 mating with internal threads in a hole through a gear 310. The gear 310 is located between suitably mounted end thrust bearings 311 that engage opposite faces thereof. An electric motor 312 is mounted on the vehicle, for example on the member 301, and drives (directly or though a reduction unit) a gear 313 meshing with the gear 310. The member 302 is extended or retracted when the motor is activated with direction of movement being depended upon the direction of rotation of the gear 310.

In the embodiment illustrated in FIGS. 3-7 the power system that moves the tailgate includes respective first and second extendable and retractable power operated devices and wherein such devices are hydraulic (or if desired pneumatic) piston cylinder units.

Figure 6:
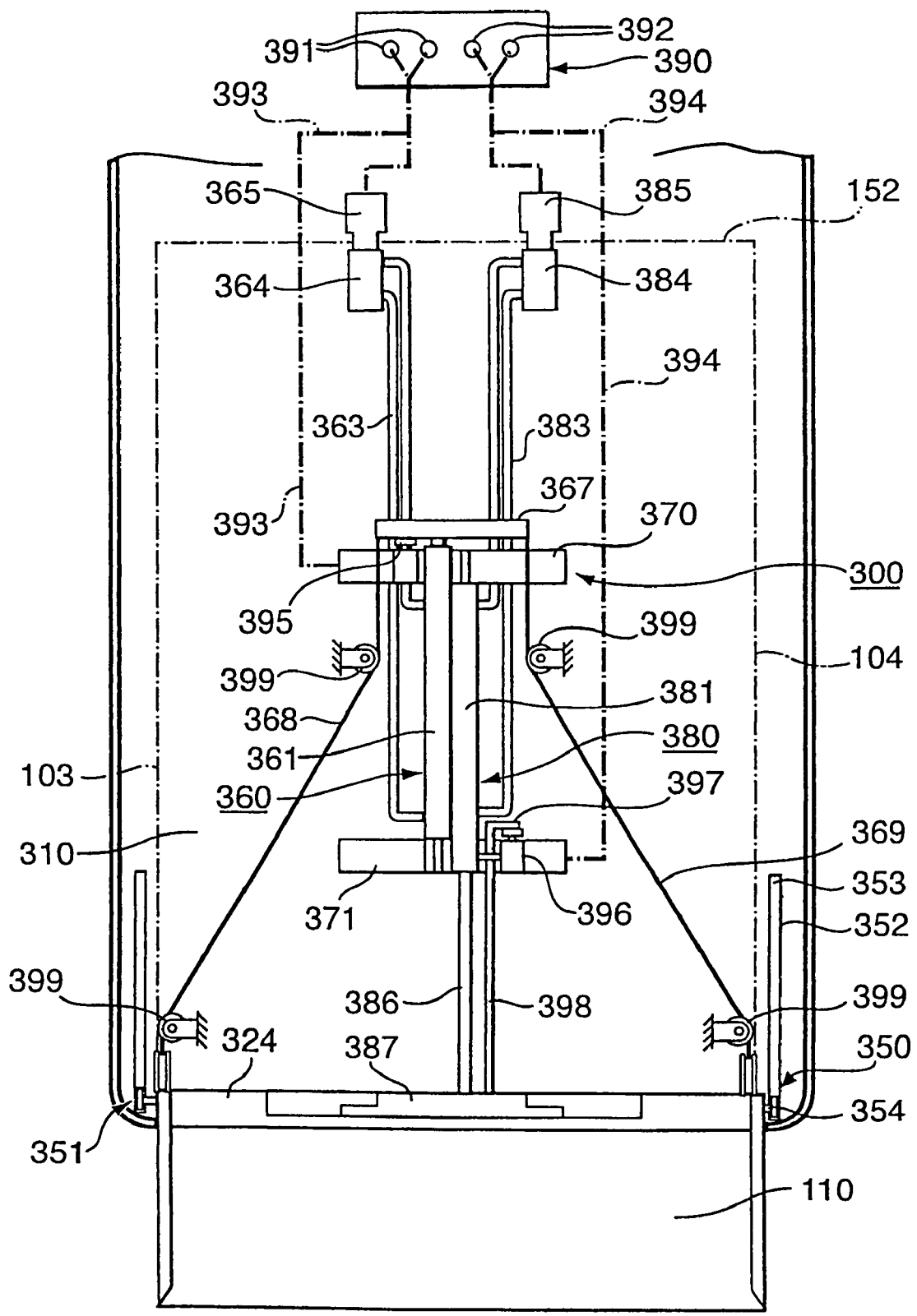
FIG. 6 is a top diagrammatic view illustrating a power system for moving the tail gate from one to the other of its various different positions depicted in respective FIGS. 3, 4, and 5 the tailgate being in the same position as depicted in FIG. 4.

Referring to FIG. 6 there is illustrated respective first and second hydraulically extendible and retractable units 360, 380. The unit 360 has a cylinder portion 361 connected in a conventional manner by hoses 363 to a hydraulic pump 364 which in turn is driven by an electric motor 365. Similarly the unit 380 has a cylinder portion 381 that is connected by hoses 383 to a hydraulic pump 384 that is driven by an electric motor 385 connected thereto. The cylinder portions 361, 381 are securely fastened in any convenient manner on the underside of the floor 101 by for example a pair of brackets 370, 371 that are spaced apart from one another longitudinally of the vehicle. Safety switches 395, 396 are located on respective mounting brackets 370, 371.

The units 360, 380 have respective piston rods 366, 386 with respective cross-heads 367 and 387 located on the free outer ends and fixedly secured thereto. The tailgate 110 is hingedly attached to the cross-head 387 as for example in the same or similar manner described in the foregoing with respect of FIGS. 1 and 2 or applicants aforementioned patent or a simple robust hinge. The hard stops limiting the arc of movement of the tailgate disclosed in the aforementioned U.S. Pat. No. 6,276,738 can be omitted if so desired as this function, as will become apparent hereinafter, can be performed by limiting travel of the piston rod 366.

The safety switch 396 is located on the bracket 371 and actuated when engaged by a lug 397 on an outer free end of a control rod 398. The control rod 398 is suitably attached at the other end to the tailgate and reciprocally moves along with the tailgate as the tailgate is moved from one to the other of its third 'retracted' position to its second position where it projects rearwardly from the vehicle. The safety switch 395 is located on the bracket 370 and is actuated by engagement with the cross-head 367 when the piston rod 366 is in its retracted position.

Switches are suitably positioned for operation by the motor vehicle operator and for this purpose a control panel 390 is diagrammatically illustrated in FIG. 6 and it is preferably located in the cab of the vehicle. The motor 365 is controlled by a pair switches 391 (or the equivalent) on the control panel 390 and motor 385 by a pair of switches 392 (or the equivalent thereof). The switches 391 are operatively associated, as represented by broken line 393, with the first safety switch 395 that is responsive to a selected operative position of the piston rod of the hydraulic cylinder unit 360 and switches 392, as represented by broken line 394, with a safety switch 396 that is responsive to a selected operative position of the piston rod of the hydraulic cylinder unit 380.

Figure 7:
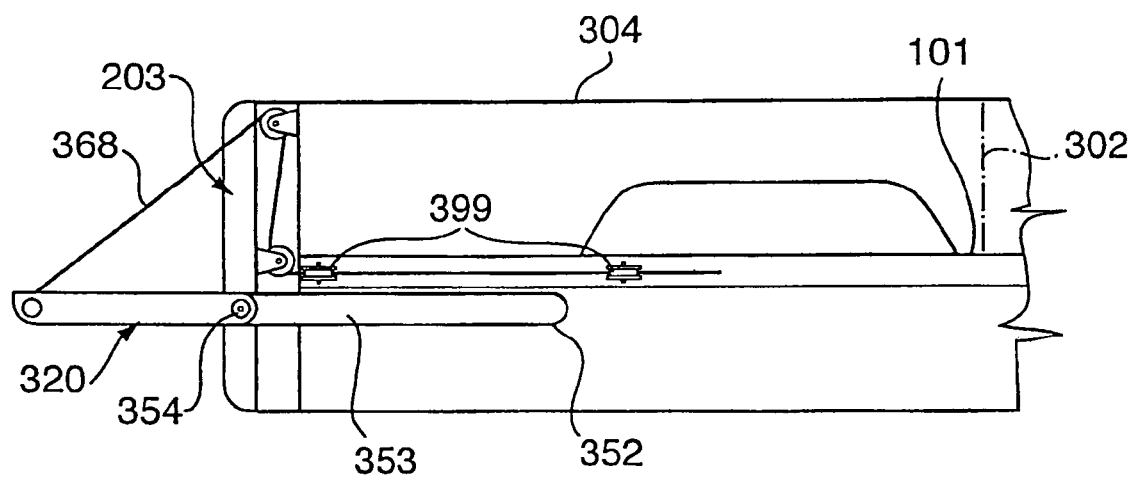
FIG. 7 is a diagrammatic partial sectional side elevational view of the box portion of the pick-up truck of FIGS. 3-6 with the tail gate in its horizontal attitude and projecting rearwardly from the vehicle as in FIGS. 4 and 6.

The power unit 360 is operatively connected to the tailgate 110 by a pair of cables 368, 369 that are connected at one end thereof to the crosshead 367 and at the other end to tailgate at a position preferably proximate the upper edge thereof as best illustrated in FIG. 7. The cables are guided by a plurality of pulleys 399 appropriately positioned and journalled on the vehicle. Some of the pulleys are located under the floor 310 while others are located on or in the respective side walls 103, 194. The pulleys are so located as to not get in the way of placing cargo in the vehicle cargo box or removing it therefrom and preferably out of sight.

Power operation of the tailgate takes place as follows. Starting with the tailgate 110 in its first i.e. full upright 'closed' position (FIG. 3) switch 391, designated 'down' on the control panel 390, is actuated. This activates electric motor 365 driving pump 364. The piston rod 366 retracts into the cylinder 361 releasing pressure on the control cables 368, 369 that are holding the tail gate in its first i.e. up 'closed' position preferably against the force of one or more compression springs (not shown) secured to the vehicle and engaging the tailgate. This allows the tailgate to descend via gravity 90 degrees to a its second i.e. full 'open' horizontal position with the compression springs serving as kickers to initiate movement. Limiting movement of the tailgate to an arc of 90 degrees is done by limiting the length of travel of the control cables 368, 369 and/or, if desired, by 'hard points' in the hinge connection of the piston rod crosshead 387 to the tailgate.

As the piston rod 366 in the cylinder 360 reaches it limit of travel switch 395 is activated and power is thereby supplied to the switches 392 designated 'in' and 'out' on the control panel 390.

To retract the tailgate under the bed of the truck (FIG. 5) switch 392 designated 'in' is actuated. A second contact is disengaged thus cutting off electric power to the switches 391 designated as 'up' and 'down' on the control panel. This feature is preferred as it avoids accidental damage to the tailgate and/or vehicle.

As unit 380 reaches the end of it retracting stroke the tailgate is drawn completely under the bed of the vehicle. To ensure the tailgate is properly aligned and remains stable rollers, or other guide means, can be provided on opposite end edges to the tailgate so as to engage the elongate glide bar associated therewith. Also the piston rod of unit 380 is preferably attached to the tailgate by a heavy duty hinge means. The hinge is preferably embedded in the lower edge of the tailgate. Also the pivot axis of the hinge is preferably in alignment with the pivot axis of the sliding pivots and maintained in alignment therewith.

The 90 degree 'hard point' incorporated in the hinge assembly and rigid attachment of the end of the piston rod 386 and securement of the cylinder 381 to the vehicle prevents the tailgate from sagging and keeps it properly aligned when the tailgate is being retracted 'in' or extended 'out'.

To move the tailgate, from its retracted position under the bed of the truck, switch 392, designated 'out' on the control panel, is actuated. As the tailgate reaches its fully extended second 'out' position the safety switch 396 is activated thus supplying power to switches 391 designated 'up' and 'down' on the control panel.

To raise the tailgate to its first i.e. closed position switch 391 designated 'up' is actuated. As the unit 360 starts to extend, pulling on cables 368, 369 to close the tailgate, safety switch 395 cuts off electric power to the switches 392 thereby disenabling hydraulic cylinder unit 380. This avoids accidentally damaging the power unit and/or vehicle.

The remotely controlled retractable tailgate is a substantial improvement over the version disclosed in applicant's aforementioned patent. The retractable tailgate disclosed in the prior patent had to be manually moved from one position to another by someone positioned at the rear of the vehicle. The power operated tailgate of the present invention can be operated from inside the cab of the vehicle eliminating the need for the operator to get out of the vehicle. Also the moving parts to release the spring loaded pivot pins can be eliminated. This greatly improves the durability and reliability of the whole unit.

The retractable tailgate does not require a complicated system of rails and rollers as usually employed by the prior art because the tailgate is supported by the 'T'-shaped frame in which the stem of the "T" is extendable and retractable and anchored to the vehicle. Although the retractable tailgate preferably has actuating mechanisms incorporated within the double wall panel of conventional tailgates it is contemplated that the mechanisms could be attached to the surface of a tailgate and covered with a housing such as a sheet of metal or plastic as a retrofit system for modifying existing pickup truck tailgates.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A pickup truck and tailgate assembly including a box portion comprising a front end wall and a pair of laterally spaced apart side walls that extend vertically upwardly from a floor and a tailgate moveable form one to another of a first "closed position abutting said side walls" and a second "open" position, said tailgate assembly being pivotally and retractably mounted on said box portion for selectively closing and opening the same, said tailgate assembly comprising:
   a tailgate,
   a pair of elongate slide members mountable in lateral spaced apart relation on said pickup truck,
   sliding pivot means interconnecting opposite ends of the tailgate with a respective one of said pair of elongate members,
   said pivot means being disposed proximate a lower marginal edge of the tailgate and slidable longitudinally along said elongate slide members,
   a first extendible and retractable assembly having relatively movable respective first and second portions, with the first portion anchorable to said pickup truck and said second portion being connected to the tailgate to pivot same on said sliding pivots moving the tailgate from a horizontal position where it projects rearwardly from said pickup truck to a vertical closed position,
   a second extendible and retractable assembly having relatively movable respective first and second portions with the first portion anchorable to said pickup truck and said second portion being hingedly connected to the tailgate proximate a lower marginal edge thereof, and
   power means connected to said first and second assemblies and operable selectively to extend and retract the same and thereby respectively pivot the tailgate from a horizontal position to a vertical position and move said tailgate back and forth longitudinally along said slide members.

2. The pickup truck and tailgate assembly of claim 1, said tailgate being pivotally moveable from a first closed position wherein the tailgate is disposed vertically and a second open position wherein the tailgate is disposed generally horizontal and projecting rearwardly from the pickup truck, said tailgate being moveable to and from said second position to a third position wherein the tailgate is retracted under a portion of said floor.

3. The pickup truck and tailgate assembly defined in claim 1 wherein said power means is disposed below an upper surface of said floor, and includes a switch means for selectively controlling operation of said power means.

4. The pickup truck and tailgate assembly as defined in claim 1 wherein said power means includes respective first and second units each of which is extendible and retractable and wherein at least one such unit comprising a linearly movable unit extendable along a linear path, each said unit having first and second portions movable relative one another with one such portion being anchored to the vehicle and the other connecting to said tailgate for moving the same.

5. The pickup truck and tailgate assembly as defined in claim 4 wherein said linearly moveable unit is connected to said tailgate to move the same from one to the other of said second and third positions.

6. The pickup truck and tailgate assembly as defined in claim 4 wherein said linearly moveable unit moves said tailgate from one to the other of said second and third positions and is connected thereto by a hinge.

7. The pickup truck and tailgate assembly as defined in claim 6 wherein said hinge is located proximate a lower marginal edge of the tailgate.

8. The pickup truck and tailgate assembly as defined in claim 4 wherein each of said units comprises a hydraulic piston cylinder unit extendible and retractable along a linear path, wherein said first unit is connected to said tail gate by a cable system for pulling the tailgate to a closed position from its open position and wherein said second unit is connected via hinge means to a lower marginal edge of the tail gate for moving the same from one to the other of said second and third positions.

9. The pickup truck and tailgate assembly as defined in claim 8 including switch means for selectively operating said units.

* * * * *